Sept. 23, 1952 H. J. HAMMERLY ET AL 2,611,801
COLLECTOR OR POWER TAKE-OFF PLUG
FOR BUS BAR DUCT SYSTEMS
Filed Feb. 24, 1949 3 Sheets-Sheet 1
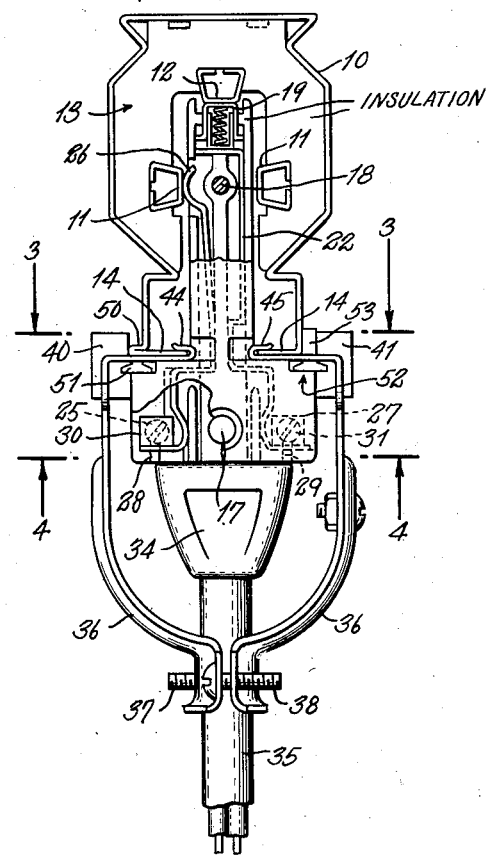
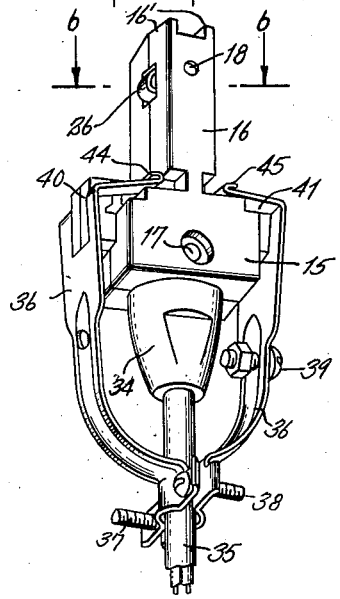
INVENTORS
HERMAN J. HAMMERLY
BY CECIL B TURTON
RYNOLD A. SALOMONE
ATTORNEY

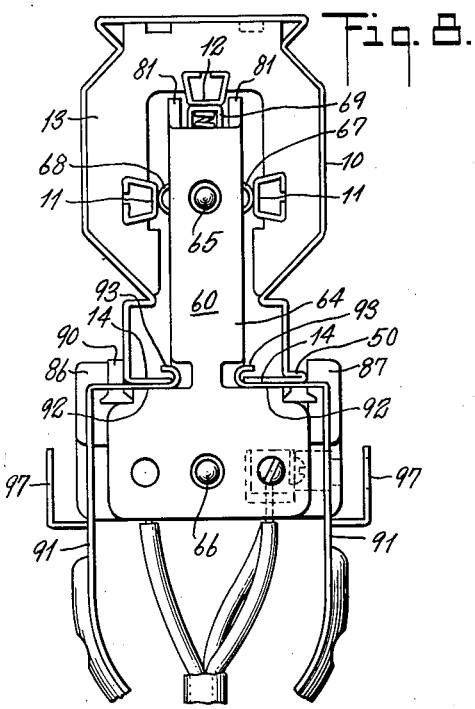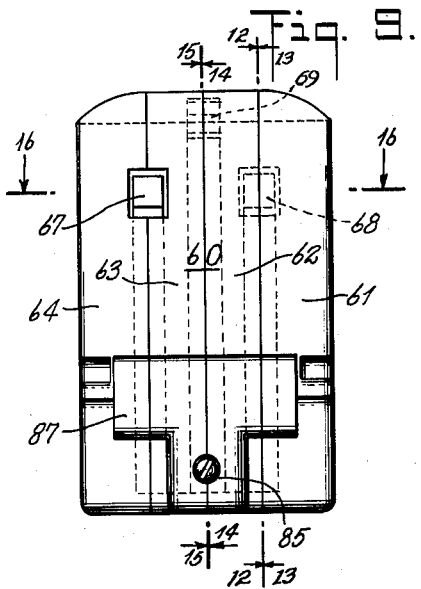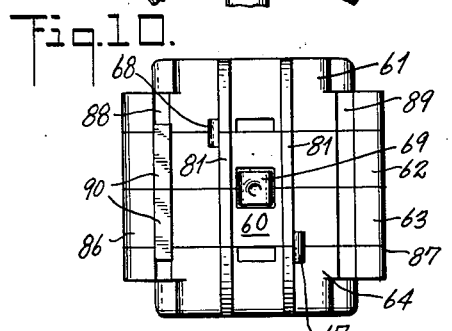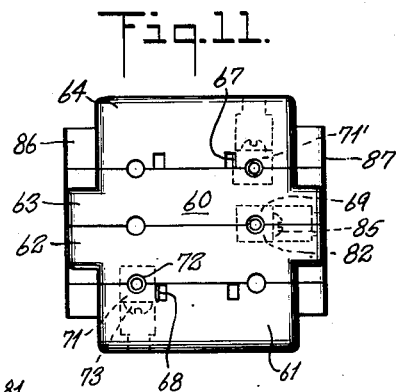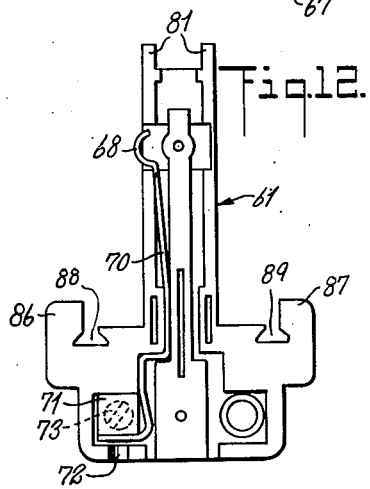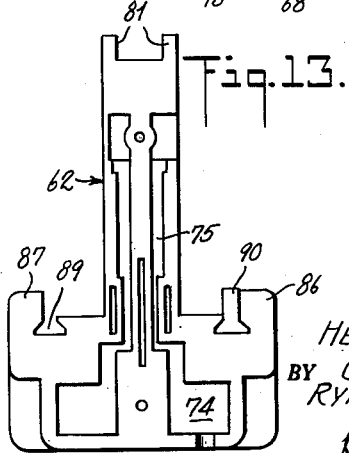
INVENTORS
HERMAN J. HAMMERLY
CECIL B. TURTON
RYNOLD A. SALOMONE
BY
ATTORNEY

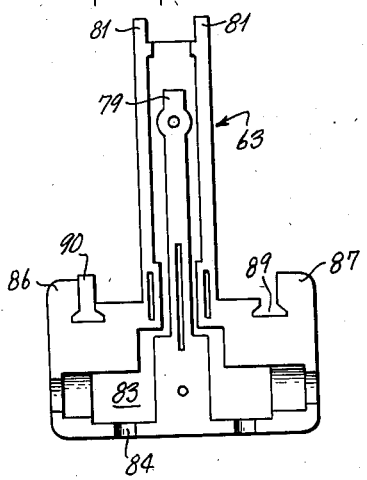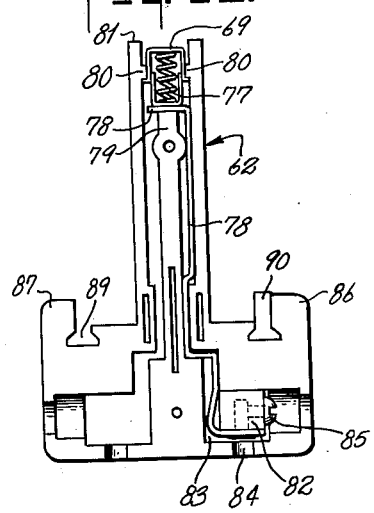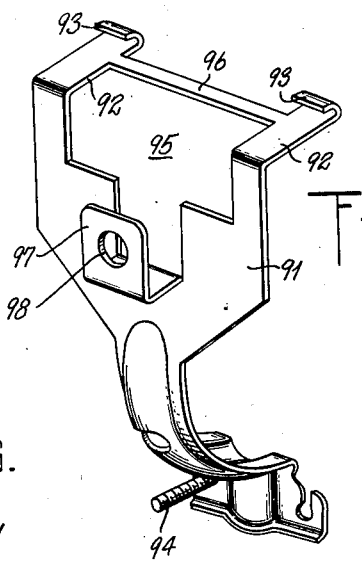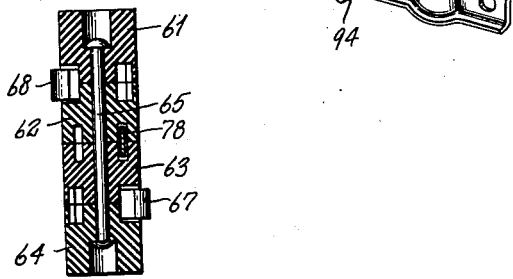

Patented Sept. 23, 1952

2,611,801

UNITED STATES PATENT OFFICE 2,611,801

COLLECTOR OR POWER TAKE-OFF PLUG FOR BUS BAR DUCT SYSTEMS

Herman J. Hammerly, Cecil B. Turton, and Rynold A. Salomone, Plainville, Conn., assignors, by mesne assignments, to General Electric Company, a corporation of New York Application February 24, 1949, Serial No. 78,102

8 Claims. (Cl. 173—361)

1

This invention relates particularly to a duct system having enclosed bus bars and an open slot which provides for access to the bus bars.

The main object is to provide a simple and effective form of plug-in device which can be readily inserted at any point and securely held in the duct and yet easily removed.

It is shown as applied to a two-pole system and a three-pole system but many features are applicable to a four-pole system.

Another object is to construct a plug which is adapted to be adjusted for alternative use in either side of a polarized system and thus avoid sectionalizing the system.

Another object is to provide a strain relief which serves as means for connecting the plug to the duct.

The details of the improvements will be understood from the following specification and drawings.

Fig. 1 is a view of the end of a duct with three bus bars and showing a collector in place.

Fig. 2 is a perspective view of the collector for a two-pole system.

Fig. 3 is a sectional view taken on the plane of the line 3—3 of Fig. 1.

Fig. 4 is a bottom plan view of the body of the collector of Figs. 1 and 3 and showing the arm of the yoke in section.

Fig. 5 is a perspective view of a fragment of the body of the collector with a stop detailed.

Fig. 6 is an enlarged sectional view of a part of the collector plug, the section being taken on the plane of the line 6—6 of Fig. 2.

Fig. 7 is an enlarged view of the inside of one half of the end of the collector.

Fig. 8 is a face view of a three-pole plug as applied to a duct and showing a part of the clamping yoke.

Fig. 9 is a side view of the plug of Fig. 8.

Fig. 10 is a plan view of the three-pole plug.

Fig. 11 is a bottom view of the three-pole plug.

Fig. 12 is a view of a part of the plug taken on the plane of the line 12—12 of Fig. 9.

Fig. 13 is a view taken on the plane of the line 13—13 of Fig. 9.

Fig. 14 is a view taken on the plane of the line 14—14 of Fig. 9.

Fig. 15 is a view taken on the plane of the line 15—15 of Fig. 9.

Fig. 16 is a sectional view taken on the plane of the line 16—16 of Fig. 9.

Fig. 17 is a perspective view of one-half of the yoke of Fig. 8.

The system to which the invention is applied

2 is described and claimed in a copending application Serial No. 73,570, filed by Herman J. Hammerly on January 29, 1949 and assigned to the same assignee as this application. This bus bar duct system has a sheet metal duct 10 containing bus bars such as 11 and 12 which are supported at intervals by insulators 13 which are mounted in the duct. The lower face or side of the duct has a slot between two flanges 14, 14 and the plug is inserted between these flanges so that its contacts engage the center bus bar 12 and one or the other side bus bars.

The plug for a two-pole system has a base 15 and a central relatively narrow extension 16 and is formed of two parts of molded insulation connected by screws or rivets 17 and 18. The extension 16 has a width somewhat smaller than the width of the slot in the duct so that the extension can be inserted freely through the slot into the duct.

Contact 19 is supported at the end of the extension and adapted to engage the center bus bar 12 when the plug is inserted. This contact is slidable in the end of the plug and backed by a spring 20 and cup 21 which rests on the end of the conductor 22 which in turn rests on the end of partition 23. The lugs 24 limit the outward thrust of the contact 19. The lower end of the contact strip 22 is fixed to the terminal block 27 which is seated in a recess between the two parts of the plug. At the end of the plug we provide flanges 16' alongside of the end contact so as to guard against shorting the end contact. The other contact 26 of the plug is located in one side of the plug extension, projects through an opening in it and is separated from contact strip 22 by partition 23.

The lower end of contact strip 26 is fixed to the terminal block 25 which is seated in a recess between the two parts of the plug.

The base 15 may be provided with passages 28 and 29 to receive conductor wire ends to be clamped to terminals 25 and 27 by set screws 30 and 31. The base also has slots 32 and 33 to receive the terminal blades of an attachment plug 34 on the end of a cable 35 so that the blades can engage the bowed parts of contact strips 22 and 26 adjacent the terminals 25 and 27.

A spring yoke is formed of two arms 36 connected by screws 37 and 38 for clamping the yoke to the cable 35. These arms are resilient. The yoke is preferably grounded at 39.

The upper ends of the arms 36 embrace the base and are bent at right angles to project over the ends of the base 15 and spread outwardly by their resiliency. Outward spreading of the arms is limited by the shoulder projections 40 and 41 on the base and by the cross bars 42 and 43 of the arms of the yoke.

The inner ends of the arms are provided with hooks 44 and 45 which are adapted to be retracted by compressing the sides of the arms until the hooks extend into the recesses 46 and 47 so that the extension of the plug can be inserted between the flanges 14, 14 and into the duct. When the plug is fully inserted, pressure on the yoke is released so that the hooks can interlock with the edges of the flanges and thus retain the plug in the duct. The yoke thus serves not only as a strain relief but supports the plug in the duct.

In this system the duct 10 is symmetrical as thus described. The plug and duct may be used as described. In order however to avoid the necessity of sectionalizing the system so as to balance the load on the two branches, the duct is provided with an externally projecting flange 50 running its entire length and constituting an extension of the flange 14 to form a wider flange 50, 14, and the plug is so designed as to ensure that it can be inserted for its contact 26 to engage the right or left bus bar according to a predetermined plan.

This is effected by providing the base of the plug with undercut grooves 51 and 52 adjacent the shoulders 40 and 41 respectively into one of which a stop 53 may be inserted and extends upward along the inner side of the adjacent shoulder. Such a stop limits the space between the stop and the adjacent side of the extension 16 and the plug can only be inserted into the duct with the contact side of the plug facing toward the other side of the duct. With the stop inserted at the right as shown in Fig. 1 opposite the contact 26, the plug can only be inserted so that the contact will engage the left hand bus bar. In other words the space between the stop 53 and the extension 16, while receiving a narrow flange 14, is too narrow to receive the wider flanges 50, 14, although the space between each shoulder 40 or 41 and the extension 16 is wide enough to receive the wider flange. By inserting the stop in the same side of the plug as the contact, the plug can only be inserted so that the contact will engage the right hand bus bar. By adjusting the plugs, it is therefore possible to arrange to draw one-half the load from one branch and the other half from the other branch.

In Figs. 8 to 17, inclusive, the invention is shown as applied to the three-pole plug or collector 60 for use in the same duct 10 as the two-pole plug with bus bars 11, 11 and 12 supported by insulators 13 and having inturned flanges 14, 14 and an external flange 50 along one edge.

In this case, the plug body is formed of four parts 61, 62, 63 and 64 of molded insulation held together by screws or rivets 65 and 66 and there are three contacts 67, 68 and 69. These contacts and terminals are mounted in recesses between the respective parts. Contact 68 is carried by a spring strip 70 which is anchored to the terminal block 71 in the base of the plug. Strip 70 is biased to project the contact from the plug so that when the plug is inserted in the duct the contact will press against one of the bus bars 11. The base of the plug has an opening 72 leading to the block 71 which is provided with a set screw 73 for connection with a branch conductor wire. Part 62 has a recess 74 and groove 75 to accommodate one half of the block 71 and the attached strip 70 and contact 68. Part 61 has a corresponding recess and groove for the other half of the terminal and contact member. Parts 64 and 63 have identical recesses and grooves to house contact 67 and its terminal 71'.

The center contact 69 is similarly housed in recesses and grooves between the parts 62 and 63 of the plug as shown in Figs. 14 and 15. The contact 69 is pressed outwardly by spring 77 which abuts against the end 78' of conductor strip 78 which rests on the partition. The outward movement of the contact is limited by the lugs 80 in the plug and the contact is guarded by flanges 81. The strip 78 is anchored to a terminal block 82 in the plug recess 83 which receives the end of a branch conductor wire through the opening 84 to be held by a set screw 85.

The three-pole plug has projecting shoulders 86 and 87 with grooves 88 and 89 symmetrically spaced from the sides of the plug for receiving a polarizing stop 90 as previously described with respect to the two-pole plug.

The yoke for clamping to the cable and to the duct is also similar to that for the two-pole plug. Each half of the yoke as shown in Fig. 17 has a frame with side arms 91 to embrace the sides of the base of the plug, flanges 92 terminating in hooks 93 for engaging the flanges 14, 14 of the duct and a clamp screw 94 for drawing the two parts together and clamp the cable. The shoulders 86 and 87 of the plug base extend through the openings 95 each in the upper end and lateral portion of one arm 91 and constitute stops for the end wall formed by the cross bar 96. Moreover as shown in Fig. 8, and also in Figs. 1, 2, and 5, the shoulders include portions projecting laterally outward from the opposite sides of the base so that the lower or inner walls of the slots 95 engage the lower laterally projecting ends of the shoulders 86 and 87 thereby to secure the collector plug 60 in the duct. As indicated in Figs. 1 and 2, the shoulders 40 and 41 extend through similar openings in the arms 36 and are engaged by the lower walls of the openings to secure the plug in the duct.

The sides of the yoke are also preferably provided with outwardly extending lugs 97 to form finger grips to aid in compressing the yoke in order to apply the yoke and plug to the duct. One lug has an opening 98 to allow for passage of a screw driver for operating the set screw 85 for securing the conductor to the center contact terminal.

We claim:

1. A plug-in collector for a bus bar duct system comprising an insulating body having an end contact for engaging a central bus bar in a duct and a contact at one side of the body for engaging a bus bar at one side of such duct, a cable having conductors connected to said contacts, a yoke secured to said cable and having outwardly springing arms embracing said insulating body and terminating in outwardly opening hooks for engaging intuned spaced apart flanges of such a duct when inserted therein.

2. A plug-in collector for a bus bar duct system comprising an insulating body having a central extension and having an end contact for engaging a central bus bar in a duct and a contact at one side of the body for engaging a bus bar at one side of such duct, a cable having conductors connected to said contacts, a yoke secured to said cable and having outwardly springing arms embracing said insulating body and terminating in outwardly opening hooks for engaging intuned spaced apart flanges of such a duct when inserted therein, and a pair of shoulders on said body on opposite sides of said extension extending in parallel spaced relation with said extension, said arms being provided with apertures in their ends through which said shoulders extend respectively so that said shoulders are engaged by the end walls of said apertures to limit the separation of said ends of said arms.

3. A branch collector plug for attachment to a duct having inturned flanges at one face with an open slot between them and having bus bars within the duct and accessible through said slot, said collector plug comprising an insulating base having an extension extending perpendicularly from its central portion and shoulders projecting from the edges of the base and parallel with said extension, contacts carried by said extension for engagement with the bus bars when inserted in through the slot of the duct and having terminals in said base, a yoke having two arms for connection at one end of each arm to a cable leading to said terminals, another part of each arm biased outwardly and embracing one of said shoulders and terminating in an outwardly turned hook lying between said shoulder and said extension for interlocking with the adjacent flange of the duct when the collector plug is inserted into the duct.

4. A branch collector plug for attachment to a duct having in-turned flanges forming a side wall with an open slot between them and having bus bars within the duct accessible through the slot, said collector plug comprising an insulating base, a relatively narrow extension on said base extending centrally from said base having a width between opposite sides somewhat less than the width of the slot in the duct so that said extension can be readily inserted into the slot, a pair of shoulders on said base on opposite sides of said extension projecting laterally from opposite sides of said base, a plurality of contacts mounted on said extension for engagement with bus bars in the duct, a cable having conductors connected to said contacts and extending from said base, a yoke having two resilient arms embracing said base, means clamping the lower ends of said arms on said cable so that the upper ends of said arms are biased apart, each said arm being provided with an aperture in its outer end through which one of said shoulders extends so that said shoulders are engaged by the inner walls of said apertures respectively, and hooks on the ends of said arms for engaging the flanges of the duct thereby to secure said plug in the duct.

5. A branch collector plug for attachment to a duct having in-turned flanges forming a side wall with an open slot between them and having bus bars within the duct accessible through the slot, said collector plug comprising an insulating base, a relatively narrow extension on said base extending centrally from said base having a width between opposite sides somewhat less than the width of the slot in the duct so that said extension can be readily inserted into the slot, a pair of shoulders on said base on opposite sides of said extension extending each from said base in parallel spaced relation with the sides of said extension, a pair of shoulder portions projecting laterally from opposite sides of said base, a plurality of contacts mounted on said extension for engagement with bus bars in the duct, a cable having conductors connected to said contacts and extending from said base, a yoke having two resilient arms embracing the sides of said base and biased apart, means securing the opposite ends of said arms on said cable, each said arm having a portion extending laterally across the end of said base toward a side of said extension and each said arm being provided with an aperture in its end and lateral portion through which one of said shoulders extends so that said shoulders are engaged by the end walls of said apertures to limit the separation of the ends of said arms and said laterally projecting portions are engaged by the opposite inner walls of said apertures respectively, and outwardly turned hooks on the ends of said lateral portions, the opposite sides of said extension being provided with recesses to receive said hooks when the arms of said yoke are pressed together so that said hooks can be inserted after said extension in the slot in a duct, said arms when released springing outward to engage said hooks with the flanges of the duct, thereby to secure said plug in the duct.

6. A branch collector plug for attachment to a duct having in-turned flanges forming a lower side wall with an open slot between them and having bus bars within the duct accessible through the slot, said collector plug comprising an insulating base, a relatively narrow extension on said base extending upward centrally from said base having a width between opposite sides somewhat less than the width of the slot in the duct so that said extension can be readily inserted upward into the slot, a pair of shoulders on said base on opposite sides of said extension extending upward from said base in parallel relation with the sides of said extension and spaced each from said extension to receive a flange on the duct, said shoulders projecting laterally from opposite sides of said base, a plurality of contacts mounted on said extension for engagement with bus bars in the duct, electric terminals in said base electrically connected to said contacts, a cable having conductors connected to said contacts and extending downward from said base, a yoke having two resilient upright arms embracing the sides of said base, means clamping the lower ends of said arms on said cable so that the upper ends of said arms are biased apart, each said arm having an upper portion extending laterally across the upper end of said base toward said extension and each said arm being provided with an aperture in its upper end and lateral portion through which one of said shoulders extends both vertically and horizontally so that the upper ends of said shoulders are engaged by the end wall of said aperture to limit the separation of the upper ends of said arms and the lower laterally projecting ends of said shoulders are engaged by the lower walls of said apertures respectively, and outwardly turned hooks on the ends of said lateral portions, the opposite sides of said extension being provided with recesses to receive said hooks when the arms of said yoke are pressed together so that said hooks can be inserted after said extension in the slot in a duct, said arms when released springing outward to engage said hooks with the flanges of the duct, thereby to secure said plug in the duct.

7. A branch collector plug for attachment to a duct having in-turned flanges forming a side wall with an open slot between them, one of said flanges being wider than the other, and having bus bars within the duct accessible through the slot, said collector plug comprising an insulating base, a relatively narrow extension on said base extending centrally from said base having a width between opposite sides somewhat less than the width of the slot in the duct so that said extension can be readily inserted into the slot, a pair of shoulders on said base on opposite sides of said extension extending from said base in parallel relation with the sides of said extension and having inner sides spaced from said extension to receive the wider of the two flanges on the duct, said shoulders having portions projecting laterally from opposite sides of said base, a plurality of contacts mounted on said extension for engagement with bus bars in the duct, a cable having conductors connected to said contacts and extending from said base, a yoke having two resilient arms embracing the sides of said base, means securing the opposite ends of said arms to said cable, each said arm being provided with an aperture through which one of said shoulders extends with its laterally projecting portion engaged by the inner wall of said aperture, means on the upper end of each arm for interlocking with said duct so as to secure said plug in the duct, said base being provided with an undercut groove adjacent said inner side of each of said shoulders, and a stop member secured in one of said grooves extending along the inner side of the adjacent shoulder and assuring the insertion of the plug in the slot in such manner that the narrower flange on the duct is between said stop and said extension.

8. A branch collector plug for attachment to a duct having in-turned flanges forming a side wall with an open slot between them, one of said flanges being wider than the other, and having bus bars within the duct accessible through the slot, said collector plug comprising an insulating base, a relatively narrow extension on said base extending centrally from said base having a width between opposite sides somewhat less than the width of the slot in the duct so that said extension can be readily inserted into the slot, a pair of shoulders on said base on opposite sides of said extension extending from said base in parallel relation with the sides of said extension and spaced from said extension to receive the wider of the two flanges on the duct, said shoulders including portions projecting laterally from opposite sides of said base, a plurality of contacts mounted on said extension for engagement with bus bars in the duct, a cable having conductors connected to said contacts and extending from said base, a yoke having two resilient arms embracing the sides of said base and biased apart, means securing the lower ends of said arms on said cable, each said arm having a portion extending laterally across the end of said base toward a side of said extension and each said arm being provided with an aperture in its end and lateral portion through which one of said shoulders extends so that said shoulders are engaged by the end wall of said aperture to limit the separation of the ends of said arms and said lateral shoulder portions are engaged by the opposite lower walls of said apertures respectively, and outwardly turned hooks on the ends of said lateral arm portions, the opposite sides of said extension being provided with recesses to receive said hooks when the arms of said yoke are pressed together so that said hooks can be inserted after said extension in the slot in a duct, said arms when released springing outward to engage said hooks with the flanges of the duct, thereby to secure said plug in the duct, said base being provided with an undercut groove adjacent the inner side of each of said shoulders, and a stop member secured in one of said grooves, extending along the inner side of the adjacent shoulder for assuring the insertion of the plug in the slot in such manner that the narrower flange on the duct is between said stop and said extension.

HERMAN J. HAMMERLY.
CECIL B. TURTON.
RYNOLD A. SALOMONE.

REFERENCES CITED

The following references are of record in the file of this patent:

UNITED STATES PATENTS

| Number | Name | Date |
|---|---|---|
| 1,277,071 | Hastings et al. | Aug. 27, 1918 |
| 2,310,024 | Frank et al. | Feb. 2, 1943 |
| 2,380,151 | David | July 10, 1945 |